(12) United States Patent
Sugimoto et al.

(10) Patent No.: US 8,722,200 B2
(45) Date of Patent: May 13, 2014

(54) LAMINATED PLATE AND COMPOSITE FORMED ARTICLE

(75) Inventors: Akio Sugimoto, Kobe (JP); Naoki Kikuchi, Kobe (JP); Hironobu Nakanishi, Kobe (JP); Seishi Suzuki, Sodegaura (JP); Takeshi Miura, Hitachinaka (JP)

(73) Assignee: Kobe Steel, Ltd., Hyogo (JP)

( * ) Notice: Subject to any disclaimer, the term of this patent is extended or adjusted under 35 U.S.C. 154(b) by 0 days.

(21) Appl. No.: 12/998,018

(22) PCT Filed: Sep. 9, 2009

(86) PCT No.: PCT/JP2009/065772
§ 371 (c)(1),
(2), (4) Date: Mar. 9, 2011

(87) PCT Pub. No.: WO2010/029955
PCT Pub. Date: Mar. 18, 2010

(65) Prior Publication Data
US 2011/0159261 A1    Jun. 30, 2011

(30) Foreign Application Priority Data

Sep. 9, 2008 (JP) ................. 2008-231249

(51) Int. Cl.
| B32B 15/08 | (2006.01) |
| B32B 7/02 | (2006.01) |
| B29C 44/12 | (2006.01) |
| B62D 29/00 | (2006.01) |
| B32B 27/32 | (2006.01) |
| B32B 15/20 | (2006.01) |
| B32B 5/18 | (2006.01) |

(52) U.S. Cl.
CPC .......... *B29C 44/1228* (2013.01); *B62D 29/002* (2013.01); *B32B 27/32* (2013.01); *B32B 5/18* (2013.01); *B32B 15/20* (2013.01); *B32B 15/08* (2013.01)
USPC ............. 428/615; 428/215; 428/174; 156/79; 156/221; 156/306.6; 156/306.9

(58) Field of Classification Search
None
See application file for complete search history.

(56) References Cited

U.S. PATENT DOCUMENTS

| 5,030,488 A * | 7/1991 | Sobolev ....................... 428/35.9 |
| 5,656,675 A * | 8/1997 | Kobayashi et al. ............. 521/79 |

(Continued)

FOREIGN PATENT DOCUMENTS

| CN | 1134346 A | 10/1996 |
| JP | 57-175425 | 10/1982 |

(Continued)

OTHER PUBLICATIONS

Propylene: The Definitive Guide and Databook, Published by Plastics Design Library, Copyright © 1998, p. 142.*

(Continued)

*Primary Examiner* — David Sample
*Assistant Examiner* — Nicole T Gugliotta
(74) *Attorney, Agent, or Firm* — Juan Carlos A. Marquez; Morris, Manning & Martin, LLP

(57) ABSTRACT

A laminated plate includes two alloy plates laminated on respective sides of a core polypropylene-based resin in which the resin has a foamable property. Advantageously, the aluminum alloy plates are composed of temper treated material selected from an O material, an H22 material to an H24 material, an H32 material to an H34 material and a T4 material.

5 Claims, 4 Drawing Sheets

(56) References Cited

U.S. PATENT DOCUMENTS

| | | | |
|---|---|---|---|
| 6,569,510 B1 * | 5/2003 | Menon et al. | 428/156 |
| 2003/0124314 A1 * | 7/2003 | Michael et al. | 428/156 |

FOREIGN PATENT DOCUMENTS

| | | |
|---|---|---|
| JP | 62-278256 | 12/1987 |
| JP | 7-90621 | 10/1995 |
| JP | 08-329908 | 12/1996 |
| JP | 10-029258 | 2/1998 |
| JP | 10-034786 | 2/1998 |
| JP | 11-323516 | 11/1999 |
| JP | 2001-253371 | 9/2001 |
| JP | 2004-042649 | 2/2004 |
| JP | 2005-133207 | 5/2005 |
| JP | 2006-056121 | 3/2006 |
| JP | 2008-202134 | 9/2008 |

OTHER PUBLICATIONS

Plastics Technologies, "Tips and Techniques: How to Mold & Extrude Using Chemical Foaming Agents", Feb. 2011.*

International Search Report for Application PCT/JP2009/065772 mailed Dec. 22, 2009.

Office Action from Chinese Patent Office for corresponding Chinese Application No. 200980135287.6, mailed Mar. 11, 2013, 8 pages in Chinese and 7 pages of its English translation.

* cited by examiner

LAMINATED PLATE AND COMPOSITE FORMED ARTICLE

TECHNICAL FIELD

The present invention relates to a lightweight laminated plate and a composite formed article, each of which is suitable for automobile bodies and parts and the like and is excellent in shape stability after cold forming. The laminated plate as referred to in the present invention is a plate comprising a core resin having foamable property and an aluminum alloy plate laminated on each of the two sides thereof. This laminated plate is formed into composite formed body article by being subjected to cold press forming and then foaming the core resin having foamable property by heating. In this connection, in the present invention, a 1000 series as a pure aluminum series (a 1200 series and an 8079 series as described later are also included) is also called an aluminum alloy.

BACKGROUND ART

For the purposes of reducing the weight as compared with members using an aluminum alloy plate singly and further imparting damping performance and noise insulation performance and the like, there have hitherto been proposed composite panels which are a lightweight composite formed article in which a resin having foamable property is interposed as a core between two aluminum alloy plates and laminated.

In order to manufacture such a lightweight composite formed panel, first of all, a resin having foamable property (foamable resin) is interposed as a core between two flat aluminum alloy plates via an adhesive resin and laminated, thereby bonding and integrating the laminate as an unfoamed laminated plate. Thereafter, this unfoamed laminated plate is formed into a desired shape by press forming or roll forming. After or before this forming, the resin having foamable property is foamed by heating at a foaming temperature of the resin having foamable property, which is higher than that at the time of bonding. The resin having foamable property as referred to herein means a resin which is foamed by heating or a resin which is foamable by heating.

With respect to this basic structure, for the purpose of enhancing various properties of composite plates, such as appearance, light weight, impact resistance, heat resistance, heat retaining properties, and durability, it is proposed to control the foaming magnification of a foamed resin and to laminate a foamed resin having a different foaming magnification (see Patent Document 1). Also, in order to suppress the separation of a layer of a resin having foamable property from inner surface of aluminum alloy plate after foaming, it is proposed to allow an adhesive layer and a resin having no foamable property layer to intervene between an aluminum alloy plate and a resin having foamable property layer (see Patent Document 2).

Here, as specific applications, if such a lightweight composite plate can also be applied in the field of automobile body panels, it is possible to contrive to reduce the weight of the body and to enhance fuel consumption and drivability. But, as is well known, automobile body panels such as outer panels or inner panels, e.g., hoods, doors, etc., roof panels, undercover panels, deck boards, and bulkheads have a relatively large area of 2 m$^2$ or more and have a complicated shape and a large forming area. For that reason, even in a steel plate which is actually used as such an automobile body panel material, or an aluminum alloy plate which is inferior in formability to the steel plate, there may be the case where press forming such as bulging, and deep drawing is relatively difficult.

In this regard, in the case where the shape is relatively simple as in noise absorbing members or damping members of automobiles or the like, or in the case where the forming area is small, it is possible to form the lightweight composite plate having a foamed resin laminated therein. But, in the case of the automobile body panel having a relatively large area, it is required that a panel having a large area can be formed without generating creases or cracks. For that reason, there is a problem of enhancing the formability of a laminated plate in which an foamable resin in an unfoamed state is laminated.

On the other hand, there is further proposed a foamed resin laminated soundproof plate which is not limited as to the shape, mounting place and weight, is thin as a whole thickness of a laminated plate, is good in plastic working such as press forming, is provided with, for example, a sufficient damping performance in a final use state after going through a heat foaming step and exhibits a soundproof performance and, a method for manufacturing the same (see Patent Document 3).

In such a foamed resin laminated soundproof plate, so far as a resin having foamable property is kept in an unfoamed state, the thickness of the laminated plate can be made thin. For that reason, after the laminated plate having this foamable resin in an unfoamed state laminated therein is formed into a prescribed panel shape by press forming or the like, it is possible to increase the thickness of this composite panel by heating it at a resin foaming temperature to form the resin having foamable property into a foamed resin. Consequently, it is possible to perform press forming in a prescribed shape while ensuring dimensional and shape precision without being limited as to the shape, mounting place and weight as a laminated plate. Also, by increasing the thickness of the foamable resin, it is possible to enhance a rigidity imparting effect or a damping performance and to exhibit a soundproof performance.

PRIOR ART DOCUMENT

Patent Document

Patent Document 1: JP-A-10-29258
Patent Document 2: JP-A-2006-56121
Patent Document 3: JP-A-2004-42649

SUMMARY OF THE INVENTION

Problem to be Solved by the Invention

For the purpose of reducing the weight, the automobile body panels having a relatively large area are formed from a metal plate which is made extremely thin to an extent of, for example, 2.0 mm or less. Even in the case where in order to more reduce the weight of an automobile body panel, a composite formed article is obtained using the unfoamed laminated plate in place of such a single plate of metal plate, it is preferable to use the same pressing or same forming condition as that at the time of forming a single plate of a metal plate as the side of manufacturing an automobile body panel. For achieving this, an unfoamed laminated plate whose plate thickness has become excessively thick as compared with the single plate of metal plate cannot be used, the plate thickness of the unfoamed laminated plate is restricted to about 3.4 mm or less, and preferably about 2.4 mm or less at the most. Also, for the purpose of more reducing the weight of the automobile body panel as a substitute of the single plate of metal plate, the plate thickness of the unfoamed laminated plate cannot be made thick exceeding 3.4 mm.

However, in the case where the plate thickness of the unfoamed laminated plate is made thin in this way, for the purpose of ensuring weight reduction and bending rigidity, it is necessary to make the plate thickness on the metal plate side relatively thin by increasing the thickness of a layer of a resin having foamable property which has a low density as compared with that of the metal plate. In consequence, the plate thickness of each metal plate constituting the unfoamed laminated plate is required to be regulated to 1.0 mm or less even in a relatively lightweight aluminum alloy plate. But, as described later, a forming limit of such a thin metal plate becomes remarkably lowered as the plate thickness becomes thin.

Meanwhile, the cold state formability of a core polypropylene based resin having foamable property is never good. Cold press forming on the automobile body panel having a relatively large area is forming into a three-dimensional shape. As compared with forming into a two-dimensional shape, remarkable elongation and elastic modulus are required in the forming into a three-dimensional shape. But, foamed resins so far are chosen while attaching importance to smoothness and beauty and do not intend such cold press formability into a three-dimensional shape. As a result, cold forming on a foamed resin is difficult from the standpoints of forming itself and shape stability of a formed article. For that reason, it is common knowledge in the conventional resin field that the cold state forming on a foamed resin and unfoamed resin into a panel or the like is required to be performed by warm or hot forming or the like.

In consequence, a thinned laminated plate in which an aluminum alloy plate is laminated on each of the two sides of such a core polypropylene based resin having foamable property is a combination of materials, each of which is difficult in performing cold forming in each constituent material and is not stable in the shape after the cold forming. Therefore, such a thinned laminated plate is difficult in performing cold forming onto the automobile body panel or the like in the common sense.

In view of these points, an object of the present invention is to provide a laminated plate in which a thin aluminum alloy plate having a remarkably lowered forming limit is laminated on each of the two sides of a core polypropylene based resin having foamable property which has inferior formability, and which can be subjected to cold forming and has excellent shape stability after this forming.

Means for Solving the Problem

In order to achieve the foregoing object, the gist of the laminated plate of the present invention is concerned with a laminated plate comprising a core polypropylene based resin having foamable property and an aluminum alloy plate laminated on each of the two sides thereof, the laminated plate being formed into a composite formed article by foaming the core polypropylene based resin having foamable property by heating after forming the laminated plate, wherein a plate thickness of the whole of the laminated plate is 3.4 mm or less, and a plate thickness of the aluminum alloy plate is from 0.05 to 1.0 mm; a plate thickness of the core polypropylene based resin having foamable property is from 0.5 to 1.4 mm; and the aluminum alloy plate is a temper treated material selected from an O material, an H22 material to an H24 material, an H32 material to an H34 material and a T4 material in terms of a temper designation specified according to the JIS H0001 standards.

Here, it is preferable that the plate thickness of the whole of the laminated plate is 2.4 mm or less; and the plate thickness of the aluminum alloy plate is from 0.05 to 0.5 mm, and the plate thickness of the core polypropylene based resin having foamable property is from 0.5 to 1.4 mm. Also, it is preferable that the aluminum alloy plate of the laminated plate is selected from 1000 series, 3000 series, 5000 series and 6000 series aluminum alloys. In the case where the aluminum alloy is of the 6000 series, it is preferable that the aluminum alloy plate is selected from an O material and a T4, material. In the case where the aluminum alloy is of the 5000 series, it is preferable that the aluminum alloy plate is selected from an O material and an H32 material to an H34 material.

For the purpose of achieving the foregoing object, the gist of the composite formed article of the present invention is concerned with the fact that after subjecting the laminated plate to cold forming, the core polypropylene based resin having foamable property is foamed by heating.

Advantageous of the Invention

The present inventors have had knowledge that in the case where the plate thickness of the aluminum alloy plate constituting the laminated plate is extremely thin, as corroborated by FIGS. 4 to 7 in the Examples as described later, the elongation is remarkably lowered as compared with the case of a relatively thick plate. For example, in the case where the aluminum alloy is an O material of 3004, it is known by, for example, Aluminum Handbook, published by Japan Light Metal Association, or the like that in the case where the plate thickness of 1.6 mm, the aluminum alloy has an elongation of about 20%. On the other hand, according to the results of an actual tensile test of an aluminum alloy thin plate made by the present inventors, in the case where the plate thickness becomes thin as 0.05 mm (50 μm), the elongation is remarkably lowered to about 3%. This is also the same as in other aluminum alloy series such as 1000 series, 3000 series, 5000 series, and 6000 series.

This remarkable lowering of elongation is caused due to the matter that in view of the fact that the plate thickness becomes extremely thin, a large local elongation is easily generated in an aluminum alloy thin plate, or the time until a large local elongation is generated becomes faster. In the actual tensile test made by the present inventors, in the O material of 3004 whose plate thickness became thin to 0.05 mm (50 μm), a large local elongation was generated at a breaking position in the center of a specimen within from 0.6 to 0.8 seconds after commencing the tensile test, thereby causing breakage. In consequence, even in the O material of 3004 having relatively high formability, in the case where the plate thickness is extremely thin, a large local elongation is easily generated within a short period of time, and the formability is remarkably lowered without obtaining a sufficient elongation (total elongation).

The present inventors have had knowledge that in the case where an aluminum alloy plate in which the plate thickness becomes thin in this way to cause a lowering of the formability is combined with a polypropylene based resin having foamable property which has low cold formability, thereby forming a laminated plate having a thin plate thickness as a whole, the cold formability is remarkably enhanced. As corroborated by the Examples as described later, according to the results of a tensile test made by the present inventors, for example, an elongation of a laminated plate prepared by laminating an O material aluminum alloy plate of 3004 having a plate thickness of 0.05 mm (50 μm) on each of the two sides of a core polypropylene based resin having foamable property and integrating the laminate is enhanced to about 14% as shown in the Examples as described later.

It may be assumed that this is caused due to the matter that since the strain distribution of the aluminum alloy thin plate is homogenized by lamination with the polypropylene based resin having foamable property, a large local elongation at a breaking position in the center of the specimen is not generated within the foregoing short period of time after commencing the tensile test, and the aluminum alloy thin plate is not broken within a short period of time.

This lamination brings about an effect for enhancing the shape stability on the side of the polypropylene based resin having foamable property. In general, a deformation amount δ obtained by giving a load (forming load) to the laminated plate 1 at the time of forming is the sum of an elastic deformation amount δE which becomes zero after removing the load and a plastic deformation amount δP which does not change even by removing the load. A proportion of elastic deformation is large in the polypropylene based resin having foamable property, therefore, spring back properties of returning to an original flat shape are high even when a prescribed shape is formed by cold forming, and the shape stability is low. On the other hand, as compared with the polypropylene based resin having foamable property, a proportion of elastic deformation is small in the aluminum alloy plate, therefore, spring back properties of returning to an original flat shape are low even when a prescribed shape is formed by cold forming, and the shape stability is high. In consequence, the effect of spring back properties of the polypropylene based resin having foamable property is suppressed by lamination, so that the shape stability is enhanced.

In consequence, according to the present invention, even in a laminated plate in which a thin aluminum alloy plate having a remarkably lowered forming limit is laminated on each of the two sides of a core polypropylene based resin having foamable property which has inferior formability, cold forming itself such as press forming on the automobile body panel having a relatively large area into a three-dimensional shape, or the like becomes possible. Also, the shape stability of a formed article after forming can be enhanced. Then, by heating this formed article to foam the core polypropylene based resin having foamable property, even when the formed article has a relatively large area, such as automobile body panels, a lightweight composite formed article having excellent bending rigidity can be obtained.

MODE FOR CARRYING OUT THE INVENTION

Figure 1:
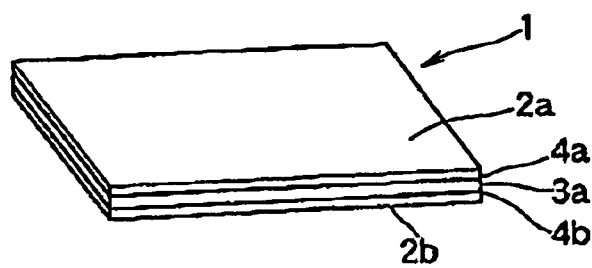
FIG. 1 is a perspective view showing an embodiment of a laminated plate of the present invention before resin foaming.
Figure 2:
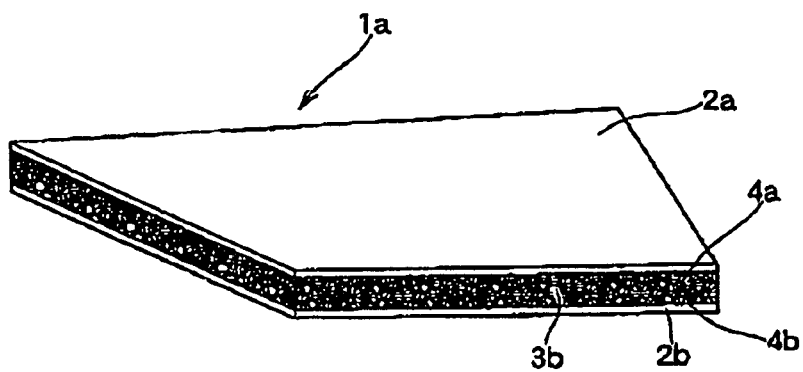
FIG. 2 is a perspective view showing an embodiment of composite formed article of the present invention after resin foaming.
Figure 3:
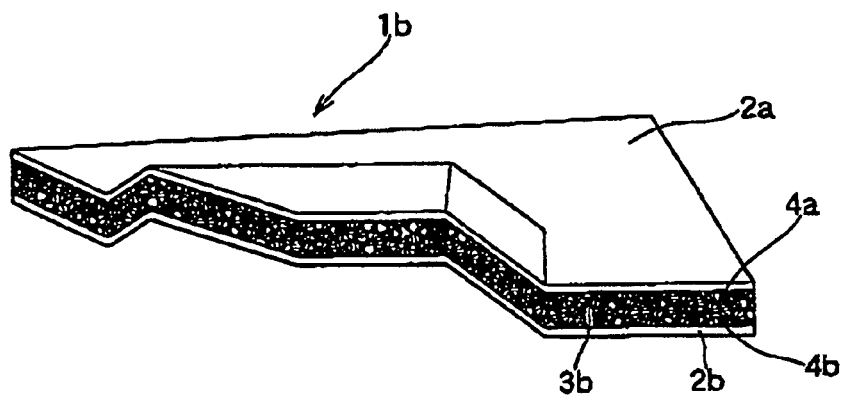
FIG. 3 is a perspective view showing other embodiment of composite formed article of the present invention after resin foaming.

Embodiments of the present invention are hereunder described by reference to the accompanying drawings. FIG. 1 is a perspective view showing a laminated plate of the present invention in which a core resin before foaming is laminated. FIG. 2 shows a state of a composite plate 1a prepared by heating a laminated plate 1 of FIG. 1 as it stands in a flat plate to foam a resin 3a having foamable property, thereby forming it into a core foamed resin 3b. FIG. 3 is a partial sectional perspective view showing a composite formed article (heat ray shielding cover) 1b prepared by heating the laminated plate 1 of FIG. 1 after cold forming to foam the resin 3a having foamable property, thereby forming it into the core foamed resin 3b.

As shown in FIG. 1, in the laminated plate 1 of the present invention which is a material for composite formed article of each of FIGS. 2 and 3, an adhesive resin 4a, the resin 3a having foamable property (unfoamed resin) and an adhesive resin 4b are interposed in a laminated form in the order from the upper side of the figure between two aluminum alloy plates 2a and 2b.

In this connection, in the case where the resin 3a itself which has foamable property has a sufficient adhesive effect to the aluminum alloy plates 2a and 2b, the adhesive resin 4 is not essential. However, in order to ensure a joining strength necessary at the time of cold forming of the laminated plate 1, or a joining strength necessary as a composite formed article, it is preferable to use the adhesive resin 4.

According to an embodiment of FIG. 1, the surface of each of these two aluminum alloy plates 2a and 2b has a flat and smooth face. However, the metal plate may be provided with irregularities with proper range and size over the entire surface or in a part thereof by applying embossing working, press working, roll working or the like, if desired.

FIG. 2 shows the planar composite formed article 1a; and FIG. 3 shows the composite formed article 1b having an HAT type shape. FIGS. 2 and 3 show the states of the composite formed bodies (formed panels) 1a and 1b prepared by cold forming the laminated plate 1 of FIG. 1 and then heating it to foam the resin 3a having foamable property, thereby forming it into the foamed resin 3a, respectively. The composite formed article 1b of FIG. 3 imitates an undercover panel prepared by bulging into an HAT type having a flat rectangular top (convex: cup) having a relatively large area among the automobile body panels.

(Plate Thickness of Laminated Plate)

The laminated plate of the present invention is objective to a thin laminated plate to be subjected to cold forming into a panel shape. In consequence, thick laminated plates which are not subjected to cold forming into a panel shape, such as buildings, and structures, fall outside the object of the present invention. As described above, in order to more reduce the weight of an automobile body panel or the like as a specific application of the laminated plate of the present invention, in the case of obtaining a composite formed article using the laminated plate of the present invention in place of a single plate of a metal plate, unfoamed laminated plates whose plate thickness is excessively thick as compared with that of the metal plate cannot be used in the press forming or for the purpose of reducing the weight. That is, it is desirable to use the same pressing or same press forming condition as that at the time of forming a single plate of a metal plate as the side of manufacturing an automobile body panel. Also, it is desirable to more reduce the weight of the automobile body panel as a substitute of the single plate of metal plate.

For that reason, it is preferable that the plate thickness of the whole of the laminated plate of the present invention is as thin as possible. The plate thickness of the whole of the laminated plate is preferably 3.4 mm or less, and more preferably 2.4 mm or less. Here, the plate thickness of the whole of the laminated plate is a total plate thickness of the two aluminum alloy plates 2a and 2b, the adhesive resins 4a and 4b and the resin 3a having foamable property as laminated. In the case where the adhesive resins 4a and 4b are absent, the plate thickness of the whole of the laminated plate is a total plate thickness of the two aluminum alloy plates 2a and 2b and the resin 3a having foamable property.

(Plate Thickness of Aluminum Alloy Plate)

It is preferable that the plate thickness of each of the aluminum alloy plates 2a and 2b to be laminated on such a thin laminated plate is as thin as possible. The plate thickness of each of the aluminum alloy plates 2a and 2b is preferably in the range of from 0.05 to 1.0 mm, and more preferably in the range of from 0.05 to 0.5 mm. However, as to the plate thicknesses of the aluminum alloy plates 2a and 2b, in the case where even one side thereof is less than 0.05 mm, since the plate thickness is too thin, the bending rigidity and bending strength are remarkably lowered in the use state as the composite formed article having a relatively large area, such as automobile body panels prepared by foaming a core foamed resin, and the like. Meanwhile, as to the plate thicknesses of the aluminum alloy plates 2a and 2b, in the case where even one side thereof exceeds 1.0 mm, strictly 0.5 mm, the weight becomes heavy, and the weight reduction is sacrificed, so that the meaning itself for forming into a composite formed article is lost.

(Kind of Aluminum Alloy Plate)

The aluminum alloy plates 2a and 2b to be laminated on the laminated plate are required to have an appropriate strength for the purpose of enhancing the cold formability (e.g., forming workability, shape stability after forming) of the laminated plate. For that reason, the aluminum alloy plates 2a and 2b are made of a temper treated material selected from an O material, an H22 material to an H24 material, an H32 material to an H34 material and a T4 material in terms of a temper designation specified according to the JIS H0001 standards. This appropriate strength is also required for the bending rigidity and bending strength as the composite formed article. As a matter of course, though the strength of the aluminum alloy plate varies depending upon a composition of components of the alloy, it is largely influenced by the temper treatment. In particular, in the aluminum alloy series such as 1000 series, 3000 series, 5000 series, and 6000 series, though temper treated materials other than those materials are high in the strength, they are too low in the elongation, so that they are not able to sufficiently enhance the cold formability of the laminated plate. Here, in the case where the aluminum alloy plate is of the 6000 series, it is preferable that the aluminum alloy plate is selected from an O material and a T4 material. Also, in the case where the aluminum alloy plate is of the 5000 series, it is preferable that the aluminum alloy plate is selected from an O material and an H32 material to an H34 material.

As described above, in the case where the plate thickness of the aluminum alloy plate constituting the laminated plate is extremely thin, the elongation is remarkably lowered as compared with the case of a relatively thick plate. Specifically, when the aluminum alloy plate is made of an O material of 3004, in the case where the plate thickness is 1.6 mm, an elongation of about 20% is revealed, whereas in the case where the plate thickness is thin as 0.05 mm (50 μm), the elongation is remarkably lowered to about 3%. This is also the same as in other aluminum alloy series such as 1000 series, 3000 series, 5000 series, and 6000 series.

The aluminum alloy plates 2a and 2b to be laminated on the laminated plate of the present invention are an aluminum alloy plate whose elongation is extremely lowered to 10% or less in view of the fact that the plate thickness is extremely thin. On the assumption of this, in the present invention, for the purpose of ensuring the foregoing necessary strength as the unfoamed laminated plate, the aluminum alloy plates 2a and 2b are made of the foregoing temper treated material.

The aluminum alloy which is suitable as the aluminum alloy plates 2a and 2b is a 1000 series, 3000 series, 5000 series or 6000 series aluminum alloy specified according to the JIS standards. These aluminum alloys, are inexpensive, and therefore, they are advantageous as compared with other alloys. In consequence, it is preferable that the foregoing temper treated material which is a usual, commercially available cold rolled plate of such an aluminum alloy is used for the aluminum alloy plates 2a and 2b. Also, basically, the aluminum alloy plates 2a and 2b are used in a state of the smooth surface without being painted or surface treated; however, they may be subjected to a generally used known surface treatment such as plating, or chemical conversion treatment, or working for imparting irregularities onto the surface, such as embossing working, if desired.

However, in an O material of a 1000 series aluminum alloy plate or the like, there is a possibility that the strength becomes weaker, and the shape stability after forming becomes low, as compared with O materials of 3000 series, 5000 series and 6000 series aluminum alloy plates. For that reason, in the case of using an aluminum alloy plate with a lower strength, such as this O material of a 1000 series aluminum alloy plate and the like, it is preferable that the plate thicknesses of the aluminum alloy plates 2a and 2b of the laminated plate are made thicker.

(Action and Effect of Laminated Plate)

In the case where the resin 3a having foamable property in an unfoamed state and the adhesive resin 4b are laminated (interposed) between the two aluminum alloy plates 2a and 2b in this way, as described above, there are brought an effect for enhancing the cold formability and an effect for enhancing the shape stability after cold forming, as compared with the case of a an aluminum alloy plate or a resin having foamable property. By lamination of the aluminum alloy plates with the polypropylene based resin having foamable property, even in the case where the aluminum alloy plate is a thin plate, the strain distribution thereof is homogenized. For that reason, in the cold forming, a large local elongation is not generated, or a time until a large local elongation is generated becomes slow, and therefore, the aluminum alloy thin plate during the cold forming is hardly broken within a short period of time.

Also, homogenization of the strain distribution by this lamination simultaneously bring about an effect for enhancing the shape stability on the polypropylene based resin having foamable property. In general, a deformation amount δ obtained by giving a load (forming load) to the laminated plate 1 at the time of forming is the sum of an elastic deformation amount δE which becomes zero after removing the load and a plastic deformation amount δP which does not change even by removing the load. In the polypropylene based resin having foamable property, a proportion of elastic deformation (elastic deformation rate) is large. For that reason, even when the polypropylene based resin having foamable property is formed into a prescribed shape by cold forming, spring back properties of returning to an original flat shape are high, and the shape stability is low. On the other hand, as compared with the polypropylene based resin having foamable property, the proportion of elastic deformation is small in the aluminum alloy plate. For that reason, in the case where the aluminum alloy plate is formed into a prescribed shape by cold forming, spring back properties of returning to an original flat shape are low. In consequence, the effect of spring back properties of the polypropylene based resin having foamable property is suppressed by lamination, so that the shape stability is enhanced. For that reason, cold forming such as press forming into a three-dimensional shape as in the automobile body panel having a relatively large area, etc. and the like becomes possible.

Also, in the case of subjecting a composite plate to cold forming into a composite formed article, the resin 3a having foamable property is interposed between the two aluminum alloy plates 2a and 2b and formed while being restrained. For that reason, plate warpage is hardly generated on the composite formed article 1b, and the shape precision of the composite formed bodies 1a and 1b is remarkably enhanced. Furthermore, even in the case where the resin 3a having foamable property is foamed, a foaming magnification of the resin 3a having foamable property between the two aluminum alloy plates 2a and 2b can be controlled by adjusting an interval distance between the aluminum alloy plates 2a and 2b. In consequence, the shape precision of the composite formed article composite plates 1a and 1b in a state where the resin is foamed is remarkably enhanced.

Furthermore, a structure in which the core foamed resin 3b after foaming is interposed between the two aluminum alloy plates 2a and 2b can be obtained by this lamination. According to this, even when the composite formed bodies 1a and 1b have a relatively large area as in automobile body panels or the like, a lightweight composite formed article with excellent bending rigidity can be obtained.

(Thickness of Core Polypropylene Based Resin Having Foamable Property)

On the assumption of the foregoing configuration of the laminated plate, in the present invention, the plate thickness of the core polypropylene based resin 3a having foamable property (thickness of the unfoamed resin layer) is specified. That is, in the case where the plate thickness of the laminated plate is 3.4 mm or less, the plate thickness of the core polypropylene based resin having foamable property is in the range of from 0.5 to 1.4 mm. Also, in the case where the plate thickness of the laminated plate is 2.4 mm or less, the plate thickness of the core polypropylene based resin having foamable property is in the range of from 0.5 to 1.4 mm. In this connection, in the case where there is a "variability" in the thickness of the unfoamed polypropylene based resin layer depending upon a site of the laminated plate, an average value in a chosen suitable site of the laminated plate is employed.

When the plate thickness of the core polypropylene based resin 3a having foamable property is too thin, a formability enhancing effect of the core polypropylene based resin 3a having foamable property (as the laminated plate) for homogenizing the strain distribution of the aluminum alloy thin plate whose elongation has been extremely lowered to 10% or less at the time of cold forming becomes low. For that reason, there is no big difference from the case of an aluminum alloy plate. Thus, in the cold forming, a large local elongation is easily generated within a short period of time, and the aluminum alloy thin plate is broken during the cold forming within a short period of time, so that the formability is largely lowered. Also, when the plate thickness of the core polypropylene based resin 3a having foamable property is too thin, the thickness of the core foamed resin 3b becomes thin, and the weight reduction is not achieved as compared with an aluminum alloy plate having the same bending rigidity or bending strength. The use of a composite plate or a composite formed article becomes meaningless.

On the other hand, when the plate thickness of the core polypropylene based resin 3a having foamable property is too thick, the effect of the aluminum alloy plate (as the laminated plate) whose thickness becomes relatively thin is down by half, and there is no big difference from the case of a polypropylene based resin having foamable property. For that reason, in the polypropylene based resin having foamable property which has a large proportion of elastic deformation (elastic deformation rate), even when a prescribed shape is formed by cold forming, spring back properties of returning to an original flat shape are high, and the shape stability is low. Also, when the plate thickness of the core polypropylene based resin 3a having foamable property is too thick, the plate thickness of the core foamed resin 3b becomes excessively thick. According to this, though the bending rigidity and bending strength in the use state of a composite plate or a composite formed article having a relatively large area, such as automobile body panels, can be ensured, since an occupied space increases, there is encountered such a problem that it is difficult to set up it within a limited space.

(Foaming Magnification of Core Polypropylene Based Resin Having Foamable Property)

A foaming magnification of the core polypropylene based resin 3a having foamable property to the core foamed resin 3b (after foaming) is preferably from about 2 to 20 times. According to this, the composite formed article having a relatively large area, such as automobile body panels, can be guaranteed to have weight reduction with bending rigidity and bending strength. When this foaming magnification is too small, the weight reduction of the composite formed article is not achieved as compared with an aluminum alloy plate having the same bending rigidity or bending strength, and a possibility that the use of a composite plate or a composite formed article becomes meaningless is high. On the other hand, when this foaming magnification is too large, a possibility that the bending rigidity and the bending strength of a composite plate or a composite formed article in the use state are remarkably lowered is high.

(Core Polypropylene Based Resin Having Foamable Property)

It is preferable that the core resin 3a having foamable property of the laminated plate is made of at least one member of a random copolymer polypropylene based resin (R. PP), a homopolypropylene based resin (H. PP) and a copolymer polypropylene based resin (B. PP). Such a polypropylene based resin has a large formability enhancing effect for homogenizing the strain distribution of the aluminum alloy thin plate whose elongation has been lowered as compared with other resins. That is, in the case where such a polypropylene based resin is combined with the aluminum alloy thin plate, which is the foregoing temper treated material, and laminated, the formability enhancing effect such as forming possibility, and shape stability is high.

In particular, when used as an automobile part, high bending rigidity, heat-resistant temperature and recycle properties are required in the state where the laminated plate is formed into a composite formed article. In view of this fact, it is preferable that the core polypropylene based resin 3a having foamable property of the laminated plate is made of at least one member of a random copolymer polypropylene based resin, a homopolypropylene based resin and a block copolymerization polypropylene based resin, each having a melt flow rate (MFR; according to ASTM D1238 at 230° C. under a load of 2.16 kg) of from 0.1 to 50 g/10 min. As the random copolymer polypropylene based resin, known random copolymers of propylene with ethylene or an α-olefin having from 4 to 20 carbon atoms are exemplified. As the block copolymer polypropylene based resin, known block copolymers of propylene with ethylene or an α-olefin having from 4 to 20 carbon atoms are exemplified. In the case where the core polypropylene based resin 3a having foamable property is a mixture of two or more kinds of polypropylene based resins, a melt flow rate (MFR; according to ASTM D1238 at 230° C. under a load of 2.16 kg) of the mixture is preferably from 0.1 to 50 g/10 min, and more preferably from 0.2 to 40 g/10 min. Above all, a resin composition composed of 100 weight parts of a composition composed of from 90 to 99 wt % of a propylene/α-olefin random copolymer (A) having a melt flow rate (MFR; according to ASTM D1238 at 230° C. under a load of 2.16 kg) of from 0.1 to 50 g/10 min and a melting point, as measured by a differential scanning calorimeter (DSC), of from 115 to 150° C. and from 1 to 10 wt % of a propylene/α-olefin random copolymer (B) having a melt flow rate (MFR; according to ASTM D1238 at 230° C. under a load of 2.16 kg) of from 0.1 to 50 g/10 min and a melting point, as measured by a differential scanning calorimeter (DSC), of 100° C. or less; and from 0.1 to 10 weight parts of a foaming agent (C) is preferable.

This resin composition enables a realization of the formability enhancing effect for homogenizing the strain distribution of the aluminum alloy thin plate whose elongation has been lowered. That is, in the case where the core polypropylene based resin 3a having foamable property is combined with an aluminum alloy thin plate which is the temper treated material such as an O material, an H22 material to an H24 material, an H32 material to an H34 material, and a T4 material and laminated, the formability enhancing effect such as forming workability, and shape stability is high.

The melt flow rate (MFR; according to ASTM D1238 at 230° C. under a load of 2.16 kg) of the propylene/α-olefin random copolymer (A) which is used for the polypropylene based resin 3a having foamable property is from 0.1 to 50 g/10 min, and preferably from 0.2 to 40 g/10 min. Also, the melting point, as measured by a differential scanning calorimeter (DSC), of the propylene/α-olefin random copolymer (A) is from 115 to 150° C., and preferably from 125 to 145° C.

A propylene content of the propylene/α-olefin random copolymer (A) is from 90 to 99.9 mol %, and preferably from 92 to 95 mol %. As the α-olefin which is copolymerized together with propylene, at least one kind of ethylene and α-olefin having from 4 to 20 carbon atom is exemplified. Such a propylene/α-olefin random copolymer (A) can be typically manufactured by copolymerizing propylene and an α-olefin in the presence of a catalyst composed mainly of a solid titanium catalyst and an organometallic compound, or a metallocene catalyst using a metallocene compound as one component of the catalyst.

The melt flow rate (MFR; according to ASTM D1238 at 230° C. under a load of 2.16 kg) of the propylene/α-olefin random copolymer (B) which is used for the polypropylene based resin 3a having foamable property is from 0.1 to 50 g/10 min, and preferably from 1 to 20 g/10 min. The melting point, as measured by a differential scanning calorimeter (DSC), of the propylene/α-olefin copolymer (B) is 100° C. or less, preferably from 40 to 95° C., and more preferably from 50 to 90° C.

Though the propylene/α-olefin copolymer (B) can be obtained by copolymerizing propylene and other α-olefin using a known stereospecific catalyst, in particular, one obtained by copolymerization using a metallocene catalyst is desirable because stickiness of the formed article is small. As the α-olefin which is copolymerized together with propylene, at least one kind of α-olefin having from 2 to 20 carbon atoms (exclusive of propylene) including ethylene, 1-butene and 1-pentene is exemplified. An α-olefin content of the propylene/α-olefin copolymer (B) to be used is from 5 to 50 mol %, and preferably from 10 to 35 mol %. Such a propylene/α-olefin copolymer (B) can be, for example, manufactured by using a catalyst described in WO 95/14717A.

As the foaming agent (C) which is used for the polypropylene based resin 3a having foamable property, any of an organic foaming agent or an inorganic foaming agent can be used.

As the organic foaming agent, for example, azo compounds, nitroso compounds, sulfonyl hydrazide compounds, other compounds and the like can be used. Specific examples thereof include azodicarbonamide, barium azodicarboxylate, azobisisobutyronitrile, N,N'-dinitrosopentamethylenetetramine, p-toluenesulfonyl hydrazide, p,p'-oxybis(benzenesulfonyl hydrazide), hydrazodicarbonamide, diphenylsulfone-3,3-disulfonyl hydrazide, p-toluenesulfonyl semicarbazide, trihydrazinotriazine, biurea and the like.

As the inorganic foaming agent, sodium hydrogencarbonate, zinc carbonate and the like, and furthermore, a heat-expandable microcapsule and the like are exemplified. Of these components having foamable property, those which cause foaming by heating at preferably 120° C. or higher, and more preferably 150° C. or higher are preferable. In this connection, the foaming agent may be used singly or in combinations of two or more kinds thereof. An addition amount of the inorganic foaming agent is preferably from 0.1 to 10 weight parts, and more preferably from 0.5 to 5 weight parts based on 100 weight parts of the resin composition composed of (A) and (B).

Furthermore, for the purpose of stabilizing the cells, a radical generator (D) may be added in an amount of from 0.05 to 0.5 weight parts, and preferably from 0.1 to 0.3 weight parts based on 100 weight parts of the resin composition composed of (A) and (B). Also, a crosslinking aid (E) may be added in an amount of from 0.1 to 0.1 weight part, and preferably from 0.2 to 0.5 weight parts based on 100 weight parts of the resin composition composed of (A) and (B).

As the radical generator (D) which is used in the present invention, an organic peroxide or an organic peroxy ester is mainly used. A decomposition temperature of the radical generator (D) for obtaining a half-life of one minute is preferably higher than the melting point of the propylene/α-olefin copolymer (B) and furthermore, is preferably higher than the melting point of the propylene/α-olefin copolymer (A).

In this connection, a decomposition temperature of the radical generator (D) for obtaining a half-life of 100 hours is preferably 40° C. or higher from the standpoint of practical use.

Specific examples of such an organic peroxide and the like include 3,5,5-trim ethylhexanoyl peroxide, octanoyl peroxide, decanoyl peroxide, lauroyl peroxide, succinic acid peroxide, acetyl peroxide, tert-butyl peroxy(2-ethylhexanoate), m-toluoyl peroxide, benzoyl peroxide, tert-butyl peroxyisobutyrate, 1,1-bis(tert-butylperoxy)-3,3,5-trimethylcyclohexane, 1,1-bis(tert-butylperoxy)cyclohexane, tert-butyl peroxymaleate, tert-butyl peroxylaurate, tert-butyl peroxy-3,3, 5-trimethylhexanoate, cyclohexanone peroxide, tert-butylperoxyisopropyl carbonate, 2,5-dimethyl-2,5-di(benzoylperoxy)hexane, tert-butyl peroxyacetate, 2,2-bis(tert-butylperoxy)butane, tert-butyl peroxybenzoate, n-butyl- 4,4-bis(tert-butylperoxy)valerate (22), di-tert-butyl diperoxyisophthalate, methyl ethyl ketone peroxide, α,α'-bis(tert-butylperoxyisopropyl)benzene, dicumyl peroxide, 2,5-dimethyl-2,5-di(tert-butylperoxy)hexane, tert-butylcumyl peroxide, diisopropylbenzene hydroperoxide, di-tert-butyl peroxide, p-menthane hydroperoxide, 2,5-dimethyl-2,5-di(tert-butylperoxy)hexyne-3,1,1,3,3-tetramethylbutyl hydroperoxide, 2,5-dimethylhexane-2,5-dihydroperoxide, cumene hydroperoxide and tort-butyl hydroperoxide.

Of these, 2,5-dimethyl-2,5-di(tert-butylperoxy)hexane and 2,5-dimethyl-2,5-di(tert-butylperoxy)hexyne-3 are preferable.

The crosslinking aid (E) which is used in the present invention is an unsaturated compound, an oxime compound, a nitroso compound or a maleimide compound each having one or two or more double bonds, or the like. A polymer radical produced by hydrogen abstraction between the propylene/α-olefin copolymer (B) and the propylene/α-olefin copolymer (A) by the radical generator (D) reacts with the crosslinking aid (E) more early than causing a cleavage reaction. That is, the crosslinking aid (E) works to stabilize the polymer radical and at the same time, to enhance mutual crosslinking between the propylene/α-olefin copolymer (B) and the propylene/α-olefin copolymer (A) and crosslinking efficiency of the individual thereof.

Specific examples of such a compound include polyfunctional monomers such as triallyl cyanurate, triallyl isocyanurate, ethylene glycol dimethacrylate, trimethylolpropane trimethacrylate, diallyl phthalate, pentaerythritol triacrylate, neopentyl glycol diacrylate, 1,6-hexanediol dimethacrylate, and divinylbenzene; oxime compounds such as quinone dioxime, and benzoquinone dioxime; p-nitrosophenol; N,N-m-phenylenebismaleimide; and mixtures of two or more kinds thereof.

Of these, triallyl isocyanurate and trimethylolpropane trimethacrylate are preferable.

A heat decomposition temperature of such a material is generally about 400° C. In order to add a heat decomposition type foaming agent to the resin to disperse it uniformly, it is necessary to knead the foaming agent at a temperature which is higher by at least 10° C. than the melting point of the propylene/α-olefin copolymer (A). Furthermore, in order that foaming of the foaming agent may not commence during kneading, it is preferable to set up the foaming temperature at from 170° C. to 300° C., which is higher by at least 10° C. than the kneading temperature and is sufficiently lower than the heat decomposition temperature. By performing the heating at from 170° C. to 300° C. in this way, the polypropylene based resin 3a having foamable property can be uniformly foamed without being deteriorated.

(Adhesive Resin)

The adhesive resins 4a and 4b are made of an adhesive resin capable of bonding the polypropylene based resin 3a having foamable property to the alumina alloy plates 2a and 2b (having an adhesive strength). As the adhesive resins 4a and 4b, a thermoplastic resin of a heat fusion type which is composed mainly of polypropylene modified with an acid such as maleic anhydride is suitably useful.

(Application Example of Resin)

As an application example of the resin, by incorporating an inorganic or metallic filler or additive, the characteristics of the composite formed article can be made more highly functional or polyfunctional. For example, when a resin having high vibration damping properties is used as the polypropylene based resin having foamable property or adhesive resin, the damping performance or the noise insulation performance can be enhanced. Also, when a conductive material is used, a welding performance is enhanced. When a metal powder is added as the conductive material to the polypropylene based resin 3a having foamable property or adhesive resin 4, the resin becomes high in density. According to this, not only the noise insulation performance increases, but the welding properties can be enhanced.

(Resin Shape)

These polypropylene based resin having foamable property and adhesive resin may be a film or a sheet. Also, either one (in that case, the other may be a film or a sheet) or both of the polypropylene based resin having foamable property and the adhesive resin in a molten state or in a solvent-dissolved state may be coated by a roll or by spraying or the like. In this connection, it is preferable that a step of drying after coating is provided.

(Manufacturing Method of Composite Plate and Formed Article)

Here, a manufacturing method of a laminated plate or a composite formed article is hereunder described.

Polypropylene Based Resin Having Foamable Property:

In the beginning, the polypropylene based resins (A) and (B) and the heat decomposition type foaming agent (C) constituting the polypropylene based resin 3a having foamable property are kneaded. The radical generator (D) and the crosslinking aid (E) may be added, if desired. Also, a material capable of imparting adhesive strength, damping properties or heat resistance, or a metal powder for enhancing the conductivity may be added. These materials are thoroughly kneaded and then formed into a film or a sheet. In the case of forming into a film, the film is wound in a coil shape. At that time, it is preferable to set up the kneading temperature of the materials lower by at least 10° C. than the heat decomposition temperature of the foaming agent to be used. If so, even when the temperature of the resin increases by kneading, it is possible to prevent foaming from occurring.

Adhesive Resin:

In the beginning, a resin material constituting the adhesive resin 4 is kneaded. This material is a resin to which a material capable of imparting adhesive strength or damping properties or a metal powder capable of imparting conductivity is added, if desired. Such a material is thoroughly kneaded and then formed into a film or a sheet. In the case of forming into a film, the film is wound in a coil shape and separately laminated, or the material is coated on the surface of an aluminum alloy plate.

In this connection, the film or sheet of the polypropylene based resin having foamable property and the adhesive resin may be heat fused and integrated, followed by winding in a coil shape. Alternatively, on the occasion of extrusion molding of the sheet or film of the resin having foamable property from a die, the polypropylene based resin having foamable property and the adhesive resin may be integrated so as to cover the surface of the resin having foamable property with the adhesive resin by dual three-layer extrusion molding. In the case where the film of the resin having foamable property and the adhesive resin film are already formed individually into a coil, by drawing out each of these two coils, the adhesive resin film 4 and the film 3a of the resin having foamable property can be simultaneously laminated on the aluminum alloy plate 2. In any case, since the polypropylene based resin 3a having foamable property is in an unfoamed state, and its thickness is thin, it can be formed in a coil shape. For that reason, since it can be delivered in a coil shape and drawn out from the coil in an execution place, the execution plate is not restricted.

Fabrication of Laminated Plate:

A method in which the aluminum alloy plates 2a and 2b serving as a cutting plate, the adhesive resin film 4 also serving as a cutting plate and the polypropylene based resin film 3a having foamable property are laminated in this order to form a laminated plate is the easiest. However, if possible from the standpoint of equipment, a laminated plate may be formed by continuously laminating these materials. That is, a laminated plate may be formed by unwinding the both of the aluminum alloy plates 2a and 2b from the coils, and simultaneously laminating the film of the polypropylene based resin having foamable property and the adhesive resin film between the aluminum alloy plates 2a and 2b while unwinding and drawing out the film of the resin having foamable property and the adhesive polypropylene based resin film from the respective coil. After such lamination, for example, when the laminated plate is interposed between heat rolls or the like and heated, the aluminum alloy plate 2 and the polypropylene based resin 3a having foamable property in FIG. 1 are integrally bonded to each other via the adhesive resin, whereby the unfoamed laminated plate 1 can be fabricated. A temperature of the heat rolls is set up at a temperature which is lower than the foaming temperature of the polypropylene based resin 3a having foamable property and is generally close to the melting point of each of the polypropylene based resin having foamable property and the adhesive resin. According to this, it is possible to bond the polypropylene based resin having foamable property composed of a polyolefin which does not originally have adhesiveness to a hydroxide film formed on the surface of the aluminum alloy plate by a modified polyolefin. As a result, it is possible to ensure the adhesive strength required for cold forming at the interface between the aluminum alloy plate and the polypropylene based resin having foamable property.

(Cold Forming)

The manufactured laminated plate 1 is subjected to cold forming so as to have a prescribed shape of each of the composite formed bodies (panels) 1a and 1b. As a method of cold forming, press forming such as bulging, deep drawing, and bending forming, or bending working can be adopted.

(Heating and Foaming)

When the composite formed article formed in a prescribed shape by this cold forming is heated to the foaming temperature, the polypropylene based resin 3a having foamable property foams to form the foamed resin 3b, whereby the composite formed bodies 1a and 1b are obtained. Heating can be performed after cold forming by using a heating furnace of a convection heat transfer mode, such as a batchwise or continuous gas furnace or electric furnace. Since the aluminum alloy has a high heat ray reflectance, a heating furnace of a far infrared ray type cannot be used therefor as it is. However, by providing a heat ray absorbing layer such as a paint, and an organic film on the external surface on at least one side of the aluminum alloy plates 2a and 2b, heating can be performed even in the heating furnace of a far infrared ray type. Also, when hot pressing capable of performing heating and/or cooling is adopted, after cold press forming, by heat foaming the polypropylene based resin 3a having foamable property without transfer to form the foamed resin 3b and further cooling the foamed resin 3b having been softened by heating, the foamed resin 3b can be hardened. According to this, it is possible to produce a composite formed article having high rigidity resulting from foaming from a flat composite plate within a short period of time. Furthermore, though a cooling time for keeping the shape after forming was necessary because a composite formed article immediately after heat foaming is soft, the composite formed article can be taken out within a short period of time without breaking the shape, by forming, which does not require the transfer, and cooling within the same die, the productivity can be enhanced.

In this connection, in the case where after first foaming the polypropylene based resin 3a having foamable property of the laminated plate 1, the laminated layer 1 is subjected to cold forming, the foregoing laminating effect of the aluminum alloy plates 2a and 2b with the film 3a of the polypropylene based resin having foamable property is down by half. That is, the effect of the foamed resin 3b after foaming for homogenizing the strain distribution of the aluminum alloy thin plate whose elongation has been extremely lowered to 10% or less is remarkably low as compared with that of the unfoamed core resin 3a having foamable property, so that the cold formability of the laminated plate 1 is remarkably lowered.

EXAMPLES

Example 1

The laminated plate 1 shown in FIG. 1 was fabricated, and cold forming was imitated in a state where the polypropylene based resin 3a having foamable property was unfoamed, thereby performing a tensile test. This is designated as Example A. Also, the composite plate (flat plate) 1a obtained by foaming the polypropylene based resin 3a having foamable property by heating this laminated plate 1 (Example A), thereby forming the core foamed resin 3b was similarly subjected to a tensile test while imitating cold forming. This is designated as Comparative Example B. Further, as Reference Example C, a single plate made of only the aluminum alloy plate 2a or 2b (plate thickness: 0.05 mm) was similarly subjected to a tensile test by imitating cold forming.

Figure 4:
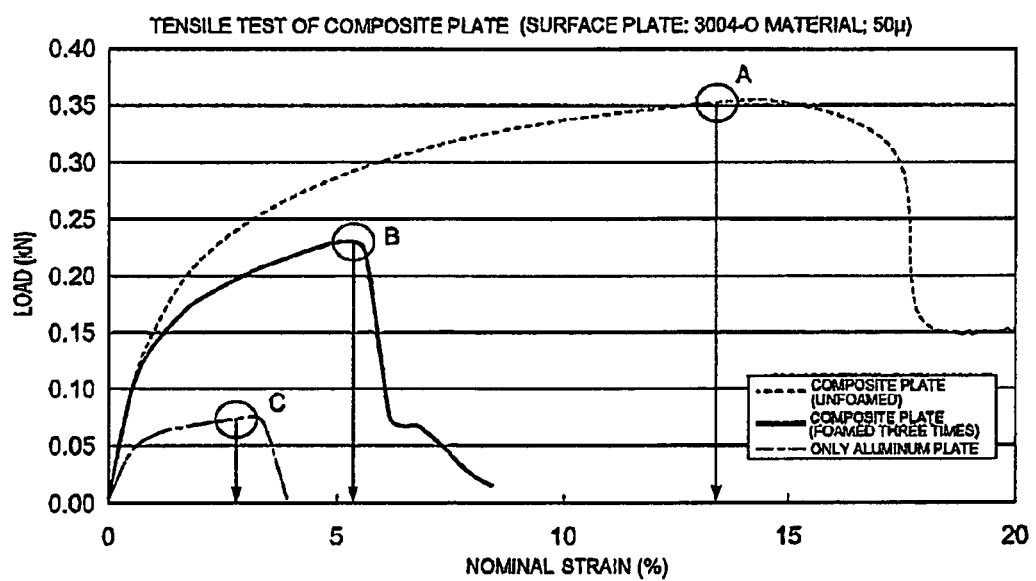
FIG. 4 is an explanatory graph showing a load-strain curve of a laminated plate of the present invention.

These results are shown in a load-strain curve of FIG. 4. In FIG. 4, a curve A shows the result of e Example A; a curve B shows the result of Comparative Example B; and a curve C shows the result of Reference Example C. An abscissa position of each of circle marks of these curves A, B and C shows a maximum strain (also called an elongation (%)) between the both ends in a parallel part of each specimen.

Figure 5:
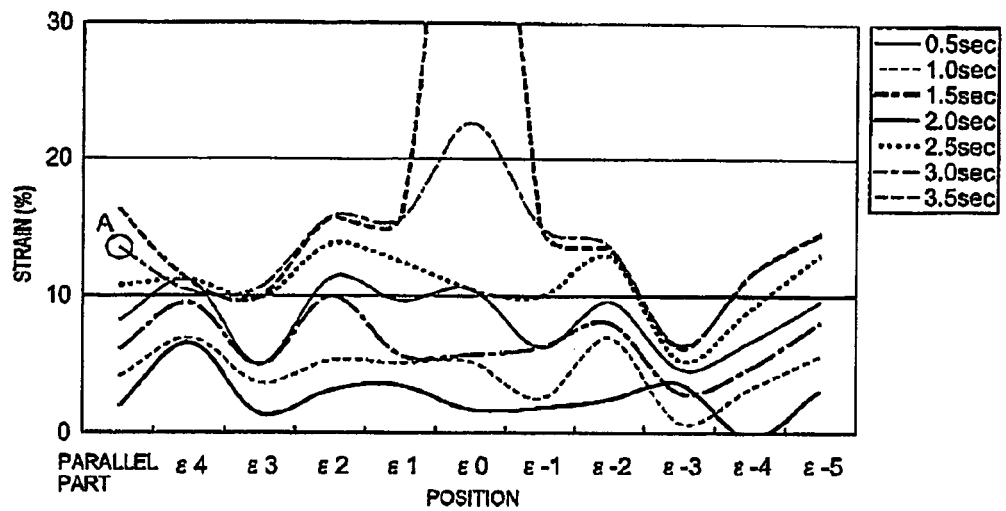
FIG. 5 is an explanatory graph showing changes of strain distribution of a specimen of Example A of FIG. 4 at every time interval.
Figure 6:
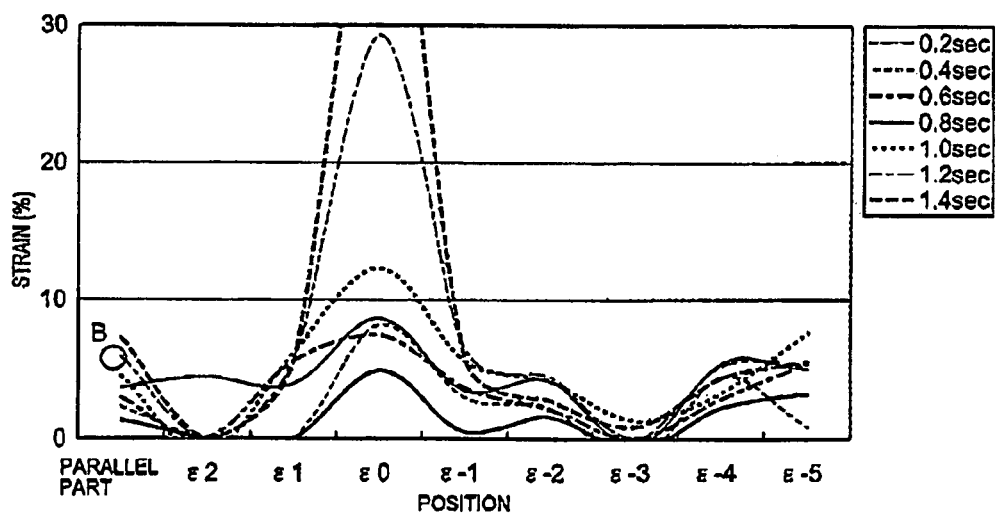
FIG. 6 is an explanatory graph showing changes of strain distribution of a specimen of Comparative Example B of FIG. 4 at every time interval.
Figure 7:
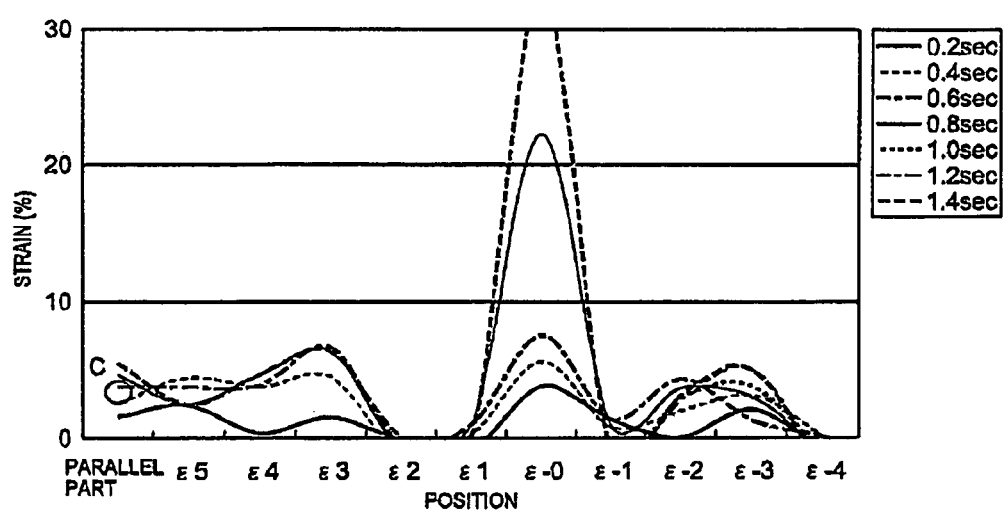
FIG. 7 is an explanatory graph showing changes of strain distribution of a specimen of Reference Example C of FIG. 4 at every time interval.

Also, on the occasion of these tensile tests, changes of the strain distribution by the position of each of the specimens of Example A, Comparative Example B and Reference Example C at every time interval are shown in FIGS. 5 to 7, respectively. FIG. 5 shows the result of Example A; FIG. 6 shows the result of Comparative Example B; and FIG. 7 shows the result of Reference Example C. In FIGS. 5 to 7, the ordinate shows a strain amount (%), and the abscissa shows a position of each specimen. In the abscissa, each position of the specimen over a length of about 60 mm is shown at $\epsilon 4$ or $\epsilon 5$ in the left and right direction of the abscissa centering on $\epsilon 0$ of a broken part (generally in the vicinity of the center) of the specimen. Also, each of A to C shown on the left side shows a value of each of A to C between the both ends in the parallel part of the specimen in FIG. 4.

Fabrication Condition of Laminated Plate 1:

1. A total plate thickness of the laminated plate 1 was set up at 1.1 mm.

2. For the aluminum alloy plates 2a and 2b constituting the laminated plate, an O material of a JIS 3004 aluminum alloy single plate having a plate thickness of 0.05 mm (50 μm) was used. A total plate thickness of the aluminum alloy plates 2a and 2b is 0.1 mm.

3. For the core polypropylene based resin 3 having foamable property, a sheet having an average plate thickness of 1.0 mm, which was obtained by kneading the following materials (A) to (E) at 155° C. and extruding in a sheet form, was used.

(A) Propylene/ethylene/butene-1 random copolymer (ethylene amount=22 wt %, butene-1 amount=3.7 wt %, MFR=7 g/10 min, melting point=130° C.): 95 wt %

(B) Propylene/α-olefin random copolymer (TAFMER XM7080, manufactured by Mitsui Chemicals, Inc., MFR=7 g/10 min, melting point=83° C.): 5 wt %

(C) Azodicarbonamide (manufactured by Eiwa Chemical Ind. Co., Ltd.): 3 weight parts based on 100 weight parts of (A)+(B)

(D) PERHEXA 25B (a registered trademark, manufactured by NOF Corporation) as a radical generator: 0.05 weight parts based on 100 weight parts of (A)+(B)

(E) Triallyl isocyanurate as a crosslinking aid: 0.5 weight parts based on 100 weight parts of (A)+(B)

4. For the adhesive resins 4a and 4b, a modified polyolefin based hot melt adhesive resin film having a melting point of 140° C. and a thickness of 0.05 mm was used commonly in the respective Examples. A total plate thickness of the adhesive resin films is 0.1 mm.

Tensile Test Condition:

The laminated plate 1 was fabricated as a rectangular planar shape having a length (L direction) of 600 mm and a width (LT direction) of 1,100 mm commonly in the respective Examples. A strip-shaped specimen (25 mm×50 mm GL) of No. 5 of JIS Z2201 was collected from this and subjected to a tensile test. The tensile test was carried out at room temperature of 25° C. on the basis of JIS Z2241 (1980) (method for tensile test of metallic materials). The test was carried out at a constant rate of a tensile rate of 200 mm/min until the specimen was broken.

Tensile Test Results:

As shown in FIG. 4, an elongation of Reference Example C in which an aluminum alloy thin plate having a plate thickness of 0.05 mm is used is about 3% (as described above, in the case where the O-material single plate of 3004 has a plate thickness of 1.6 mm, it has an elongation of about 20%). Also, while illustration is omitted, even in the case where the plate thickness of the aluminum alloy plate of this Reference Example C was thickened to 0.08 mm, the elongation of the single plate of aluminum alloy thin plate was about 3% and did not increase.

On the other hand, as shown in FIG. 4, the elongation of the unfoamed laminated plate 1 of Example A obtained by laminating this aluminum alloy thin plate increases to about 14%. Also, while illustration is omitted, even in the unfoamed laminated plate 1 which is a laminated plate under the same condition but in which the aluminum alloy plates 2a and 2b are replaced by an 8079 series aluminum alloy thin plate, the measurement results of the tensile test reveal that the elongation was about 17 to 18% and similarly increased.

On the other hand, the composite plate 1a in which the polypropylene based resin 3a having foamable property of Example A is foamed to form the core foamed resin 3b is the case of Comparative Example B shown in FIG. 4. The elongation of Comparative Example B is about 5% and is not greatly different from that of Reference Example C concerning the single plate of aluminum alloy thin plate.

Changes of Strain Distribution at Every Time Interval:

Also, when FIGS. 5 to 7 each showing the changes of the strain distribution at every time interval are compared with each other, in FIG. 7 of Reference Example C (an aluminum alloy thin plate), a large local elongation (mountain at the ϵ0 position) was abruptly generated and grew at a breaking position ϵ0 in the center of the specimen within a short period of time of from 0.6 to 0.8 seconds after commencing the tensile test, thereby causing breakage. That is, in Reference Example C, a large local elongation was generated within a short period of time. On the other hand, it is noted that the generation and growth of a local elongation (mountain at the ϵ0 position) after commencing the tensile test become slow in terms of time in the order of the case of Comparative Example B in FIG. 6 and the case of Example A in FIG. 5. In other words, it is noted that strains at any positions in the parallel part of the specimen are substantially equal, and the elongation uniformly proceeds over along period of time.

It is noted from these results that as described above, even in the O material aluminum alloy plate of a 3004 series having relatively high formability, in the case where the plate thickness is extremely thin, a local elongation is easily generated, a sufficient elongation (total elongation) is not obtained, and the formability is remarkably lowered. Then, it is corroborated from FIG. 4 that in the case where an aluminum alloy plate having a thin plate thickness and having lowered formability is combined with a resin having foamable property which has low cold formability to form a laminated plate having a thin plate thickness as a whole, the generation and growth of a local elongation are suppressed, and the elongation and the cold formability are remarkably enhanced.

Furthermore, it can be assumed that the unfoamed laminated plate 1 of Example A having an elongation of about 14% is able to be subjected to cold forming such as press forming and is excellent in shape stability. In consequence, it is corroborated from these results that there is brought an effect for enhancing the formability through the lamination of the aluminum alloy plates 2a and 2b with the film 3a of the polypropylene based resin having foamable property. That is, it confirms that even a laminated plate in which a thin aluminum alloy plate having a remarkably lowered forming limit is laminated on each of the two sides of a core resin having foamable property which has inferior formability is able to be subjected to forming and is excellent in shape stability after forming.

Also an experimental result, in the case where the laminated plate 1 after resin foaming is subjected to cold forming as in Comparative Example B, shows that the foregoing laminating effect of the aluminum alloy plates 2a and 2b with the film 3a of the polypropylene based resin having foamable property is down by half, thereby causing a lowering of the formability. In consequence, the importance of cold forming the laminated plate 1 before resin foaming is confirmed.

Example 2

With respect to the cold formability of the laminated plate 1 of the present invention, in particular, the shape stability after cold forming which had not been confirmed in a tensile test Example 1, a critical forming height without cracking and shape stability after forming were evaluated by a bulging test. These results are shown in Tables 1 and 2. Table 1 shows the lamination condition and cold formability of the laminated plate 1 of the present invention. Table 2 is concerned with a single plate (sole plate) of each of the aluminum alloy plate and the sheet of the resin having foamable property, which constitutes the laminated plate and shows the condition and cold formability.

The fabrication condition of laminated plates of Examples 1 to 12 of Table 1 and single plates of Comparative Examples of Table 2 is the same as the fabrication condition of the laminated plate 1 of Example 1. However, the fabrication condition of the laminated plate 1 of the following Examples are different from those of Example 1 in only portions described below.

In Examples 13 and 14 of Table 1, a material obtained by extruding the following resin alone into a sheet form and having an average plate thickness of 1.0 mm was used.

Example 13

Propylene homopolymer having an MFR of 2.1 g/10 min

Example 14

Propylene block copolymer having an MFR of 2.0 g/10 min [PRIME POLYPRO J-702LJ, manufactured by Prime Polymer Co., Ltd.]

In Examples 15 to 17 of Table 1, a material obtained by kneading 100 weight parts of the following resins (having an MFR, as calculated as a mixed resin, of 5.3 g/10 min) with 1 weight part of azodicarbonamide, 0.05 weight parts of PERHEXA 25B and 0.5 weight parts of triallyl isocyanurate, and extruding into a sheet form having an average plate thickness of 1.0 mm was used.

Examples 15 to 17

40 weight parts of a propylene homopolymer having an MFR of 1.6 g/10 min 20 weight parts of a propylene block copolymer having an MFR of 0.54 g/10 min [PRIME POLYPRO B-150M, manufactured by Prime Polymer Co., Ltd.]

40 weight parts of a propylene block copolymer having an MFR of 55.0 g/10 [PRIME POLYPRO J-739EP, manufactured by Prime Polymer Co., Ltd.]

Also, the resins having foamable property of Comparative Examples of Table 2 are as follows.

Resin having foamable property of Comparative Example 24: Same as the resin having foamable property of Examples 1 to 14

Resin having foamable property of Comparative Example 25: Same as the resin having foamable property of Example 15

Resin having foamable property of Comparative Example 26: Same as the resin having foamable property of Example 16

Resin having foamable property of Comparative Example 27: Propylene block copolymer having an MFR of 54 g/10 min [PRIME POLYPRO J-739EP manufactured by Prime Polymer Co., Ltd.]

In Table 1, the plate thickness of the film 3a of the resin having foamable property of the laminated plate 1 is constant as 1.0 mm. Also, for the aluminum alloy plates 2a and 2b, each of aluminum alloy plates of JIS 8079 series (a pure Al based alloy for foil containing 0.1% of Si and 1.0% of Fe, with the balance being Al), 1200 series and 3004 series was used, and the plate thickness was varied variously. In this connection, in Table 1, the term "series" described for the material of the used aluminum alloy plate means each of standardized alloys designated as "8079", "1200", "3004" and "5052".

Critical Forming Height without Cracking:

In the beginning, the laminated plate 1 was cut into a specimen having a length of 180 mm and a width of 110 mm. Then, a test for a critical forming height without cracking was carried out by performing bulging at a holddown pressure of 200 kN and a punch rate of 240 mm/min by using a spherical bulging punch having a diameter of 101.6 mm and using R-303P as a lubricant, thereby determining a height (mm) when the specimen was cracked. The test was carried out three times for each sample, and an average value thereof was employed. It is meant that the larger the critical forming height without cracking, the more excellent the bulging properties. For example, in order to satisfy the bulging properties required for automobile forming panels of the foregoing applications, the critical forming height without cracking may be 15 mm or more.

Shape Stability:

As to the shape stability, when a bulged article was allowed to stand after removing a load, a spring back amount was evaluated through visual inspection. The case where the spring back amount is large was evaluated as "x", and the case where the spring back amount is small was evaluated as "○".

Even in the case of the JIS 1200 series aluminum plate, it is known by the above-cited Aluminum Handbook, published by Japan Light Metal Association, or the like that when the O material has a plate thickness of 1.6 mm, it has an elongation of about 40%. On the other hand, when the plate thickness is thin as 0.05 mm (50 μm), similar to the O material of the foregoing 3000 series aluminum alloy plate or the like, the elongation is remarkably lowered to about 5%.

As shown in Table 1, in Examples 3 to 8 and 11 to 16, even when the aluminum alloy plate is made thin as 1.0 mm or less, the critical forming height without cracking is 13 mm or more, and the shape stability after cold forming is excellent. On the other hand, in each of single plates or sheets of the aluminum alloy or resin having foamable property of Comparative Examples 18 to 27 of Table 2, even when the critical forming height without cracking is 13 mm or more (even when forming can be performed), the shape stability is inferior in all instances, and cold forming is difficult with respect to the bulging properties required for forming of a panel or the like.

It is confirmed from these results that the unfoamed laminated plate 1 as the example is able to be subjected to cold forming such as press forming and is excellent in the shape stability. In consequence, the effect for enhancing the formability through the lamination of the aluminum alloy plates 2a and 2b with the film 3a of the polypropylene based resin having foamable property is corroborated from these results. That is, it is corroborated that even a laminated plate in which a thin aluminum alloy plate having a remarkably lowered forming limit is laminated on each of the two sides of a core polypropylene based resin having foamable property which has inferior formability is able to be subjected to forming, and a laminated plate having excellent shape stability after forming can be provided.

Also, as compared with the foregoing Examples using the aluminum alloy whose temper treatment condition falls within the scope, in Comparative Examples 1, 2, 9, 10 and 17 in which the temper treatment condition of the aluminum alloy plate falls outside the scope, in a thin region of 1.0 mm or less, the shape stability after forming is obtained first when the critical forming height without cracking is relaxed to less than 10 mm. In other words, in these Comparative Examples in which the temper treatment condition of the aluminum alloy plate falls outside the scope, when the critical forming height without cracking is high as 10 mm or more, the shape stability after forming is not obtained, and there is a remarkable difference in the formability of a laminated plate from that in the Examples.

The technical meanings of the temper treatment condition of the aluminum alloy plate of the present invention in influences giving to the critical forming height without cracking and the shape stability after forming and for specifying them in forming of a laminated plate are corroborated from these results.

TABLE 1

| | Condition of laminated plate 1 | | | | Formability of laminated plate 1 | | |
|---|---|---|---|---|---|---|---|
| | Al alloy plates 2a and 2b | | Resin 3a having foamable property | | Critical forming | | |
| No. | Material and temper treatment | Thickness (mm) | Material | Thickness (mm) | height without cracking (mm) | Shape stability after forming | Overall evaluation |
| 1 | 8079 series H18 material | 0.05 | R. PP (MFR = 7.0) | 1.0 | <10 | ○ | x |
| 2 | 8079 series H18 material | 0.08 | R. PP (MFR = 7.0) | 1.0 | <10 | ○ | x |
| 3 | 1200 series O material | 0.10 | R. PP (MFR = 7.0) | 1.0 | 18 | ○ | ○ |
| 4 | 1200 series O material | 0.15 | R. PP (MFR = 7.0) | 1.0 | 20 | ○ | ○ |
| 5 | 1200 series H22 material | 0.10 | R. PP (MFR = 7.0) | 1.0 | 17 | ○ | ○ |
| 6 | 1200 series H22 material | 0.15 | R. PP (MFR = 7.0) | 1.0 | 19 | ○ | ○ |
| 7 | 1200 series H24 material | 0.15 | R. PP (MFR = 7.0) | 1.0 | 15 | ○ | ○ |
| 8 | 1200 series H24 material | 0.15 | R. PP (MFR = 7.0) | 1.0 | 17 | ○ | ○ |
| 9 | 3004 series H18 material | 0.05 | R. PP (MFR = 7.0) | 1.0 | <10 | ○ | x |
| 10 | 3004 series H18 material | 0.08 | R. PP (MFR = 7.0) | 1.0 | <10 | ○ | x |
| 11 | 3004 series O material | 0.05 | R. PP (MFR = 7.0) | 1.0 | 13 | ○ | ○ |
| 12 | 3004 series O material | 0.08 | R. PP (MFR = 7.0) | 1.0 | 17 | ○ | ○ |
| 13 | 5052 series O material | 0.05 | H. PP (MFR = 2.1) | 1.0 | 15 | ○ | ○ |
| 14 | 5052 series O material | 0.05 | B. PP (MFR = 2.0) | 1.0 | 15 | ○ | ○ |
| 15 | 5052 series O material | 0.05 | H. PP:B. PP = 0.4:0.6 | 1.0 | 15 | ○ | ○ |
| 16 | 5052 series H34 material | 0.15 | H. PP:B. PP = 0.4:0.6 | 1.0 | 18 | ○ | ○ |
| 17 | 5052 series H38 material | 0.15 | H. PP:B. PP = 0.4:0.6 | 1.0 | <10 | ○ | x |

TABLE 2

| | Condition of single plate | | | | Formability of single plate | | |
|---|---|---|---|---|---|---|---|
| | Al alloy plate | | Resin having foamable property | | Critical forming | | |
| No. | Material and temper treatment | Thickness (mm) | Material | Thickness (mm) | height without cracking (mm) | Shape stability after forming | Overall evaluation |
| 18 | 8079 series H18 material | 0.05 | — | — | 17 | x | x |
| 19 | 8079 series H18 material | 0.08 | — | — | 20 | x | x |
| 20 | 8079 series O material | 0.05 | — | — | <10 | x | x |
| 21 | 8079 series O material | 0.08 | — | — | <10 | x | x |
| 22 | 1200 series O material | 0.10 | — | — | 15 | x | x |
| 23 | 1200 series O material | 0.15 | — | — | 15 | x | x |
| 24 | — | — | R. PP (MFR = 7.0) | 1.0 | 20 | x | x |
| 25 | — | — | H. PP (MFR = 2.1) | 1.0 | 15 | x | x |
| 26 | — | — | B. PP (MFR = 2.0) | 1.0 | 15 | x | x |
| 27 | — | — | B. PP (MFR = 54) | 1.0 | <10 | x | x |

INDUSTRIAL APPLICABILITY

In the light of the above, according to the present invention, it is possible to provide a laminated plate which is able to be subjected to cold forming such as press forming on automobile body panels having a relatively large area and the like into a three-dimensional shape or the like, and is excellent in shape stability after forming. Also, even when used for panels having a relatively large area such as automobile body panels, it is possible to provide a laminated plate for composite formed article having excellent bending rigidity and bending strength. In consequence, the present invention is suitable for automobile body panels having a relatively large area, such as outer panels or inner panels, e.g., hoods, doors, etc., roof panels, undercover panels, deck boards, and bulkheads.

While the present invention has been described in detail with reference to specific embodiments thereof, it will be apparent to one skilled in the art that various changes and modifications can be made herein without departing from the spirit and scope thereof. The present application is based on a Japanese patent application filed on Sep. 9, 2008 (Japanese Patent Application No. 2008-231249), and the contents thereof are incorporated herein by reference.

EXPLANATIONS OF REFERENCE NUMERALS AND SIGNS

1: Laminated plate
1a: Composite formed article
1b: Composite formed article
2: Aluminum alloy plate
3a: (Film of) (core) polypropylene based resin having foamable property
3b: (Core) foamed resin
4: Adhesive resin film

The invention claimed is:
1. A laminated plate, comprising:
a core polypropylene-based resin in an unfoamed state and having a foamable property; and
an aluminum alloy plate laminated on each of two sides of the core polypropylene-based resin in the unfoamed state such that strain distribution of the alloy plates will be homogenized with the polypropylene-based resin in the unfoamed state upon shaping of the alloy plates with the core polypropylene-based resin in the unfoamed state disposed between the alloy plates to a prescribed shape via a cold forming process, wherein:

a total thickness of the laminated plate is 3.4 mm or less;

a plate thickness of each aluminum alloy plate is from 0.05 to 1.0 mm;

a plate thickness of the core polypropylene-based resin in the unfoamed state and having foamable property is from 0.5 to 1.4 mm; and each aluminum alloy plate is composed of a temper treated material selected from an O material, an H22 material to an H24 material, an H32 material to an H34 material and a T4 material in terms of a temper designation specified according to the JIS H0001 standards; and wherein the core polypropylene-based resin in the unfoamed state disposed between the alloy plates is capable of foaming upon application of heat to the core polypropylene-based resin in the unfoamed state.

2. The laminated plate according to claim 1, wherein the thickness of the laminated plate is 2.4 mm or less; and the plate thickness of each aluminum alloy plate is from 0.05 to 0.5 mm, and the plate thickness of the core polypropylene-based resin having foamable property is from 0.5 to 1.4 mm.

3. The laminated plate according to claim 1, wherein each aluminum alloy plate is composed of an alloy selected from the group consisting of 1000 series, 3000 series, 5000 series and 6000 series aluminum alloys.

4. The laminated plate according to claim 1, wherein the core polypropylene-based resin has a melt flow rate according to ASTM D1238 at 230° C. under a load of 2.16 kg of from 0.1 to 50 g/10 min; and the polypropylene-based resin comprises resin selected from the group consisting of a random copolymer polypropylene-based resin, a homopolypropylene based resin and a block polypropylene-based resin.

5. A composite formed article obtained by subjecting the laminated plate according to claim 1 to cold forming to shape the alloy plates with the core polypropylene-based resin in the unfoamed state disposed between the alloy plates to a prescribed shape and then foaming the core polypropylene-based resin having foamable property by heating.

* * * * *